United States Patent [19]

Hung et al.

[11] Patent Number: 6,069,212
[45] Date of Patent: May 30, 2000

[54] TRANSFER OF POLYMER PARTICLES BETWEEN VAPOR PHASE POLYMERIZATION REACTORS CONTAINING QUENCH-COOLED SUBFLUIDIZED PARTICULATE BEDS OF POLYMERIZED MONOMER

[75] Inventors: Scott Ching-Sheng Hung; Kwok-Fu Lee; Joseph Michael Aubuchon, all of Houston, Tex.; Daryl Henry Webster, Gainesville, Ga.; James Hanawalt Lee, Naperville, Ill.

[73] Assignee: BP Amoco Corporation, Chicago, Ill.

[21] Appl. No.: 08/914,683

[22] Filed: Aug. 19, 1997

Related U.S. Application Data

[60] Provisional application No. 60/024,419, Aug. 20, 1996.

[51] Int. Cl.[7] ................. C08F 10/06; C08F 2/34
[52] U.S. Cl. ................. 526/65; 526/64
[58] Field of Search ......................... 526/64, 65

[56] References Cited

U.S. PATENT DOCUMENTS

| | | |
|---|---|---|
| 4,101,289 | 7/1978 | Jezl et al. ................... 23/288 |
| 4,420,592 | 12/1983 | Kato . |
| 4,535,134 | 8/1985 | DeLorenzo et al. ............ 526/88 |
| 4,703,094 | 10/1987 | Raufast ....................... 526/65 |
| 4,902,483 | 2/1990 | Raufast ....................... 422/134 |
| 5,169,913 | 12/1992 | Staffin et al. ................ 526/65 |
| 5,504,166 | 4/1996 | Buchelli et al. .............. 526/60 |

FOREIGN PATENT DOCUMENTS

| | | |
|---|---|---|
| 0192427 | 8/1986 | European Pat. Off. . |
| 9324533 | 12/1993 | WIPO . |

*Primary Examiner*—David Buttner
*Attorney, Agent, or Firm*—Wallace L. Oliver; Frederick S. Jerome

[57] ABSTRACT

Method and apparatus are described for continuous vapor phase polymerization of a polymerizable monomer or mixture thereof to produce normally solid polymer substances in two or more serially disposed vapor phase polymerization reactors, each containing a quench-cooled subfluidized particulate bed of polymerized monomer. More specifically, method and apparatus for transfer of polymer particles between high pressure, reactive gas-filled, continuous, vapor-phase polymerization reactors while maintaining each at independently selected operating conditions.

19 Claims, 1 Drawing Sheet

U.S. Patent May 30, 2000 6,069,212
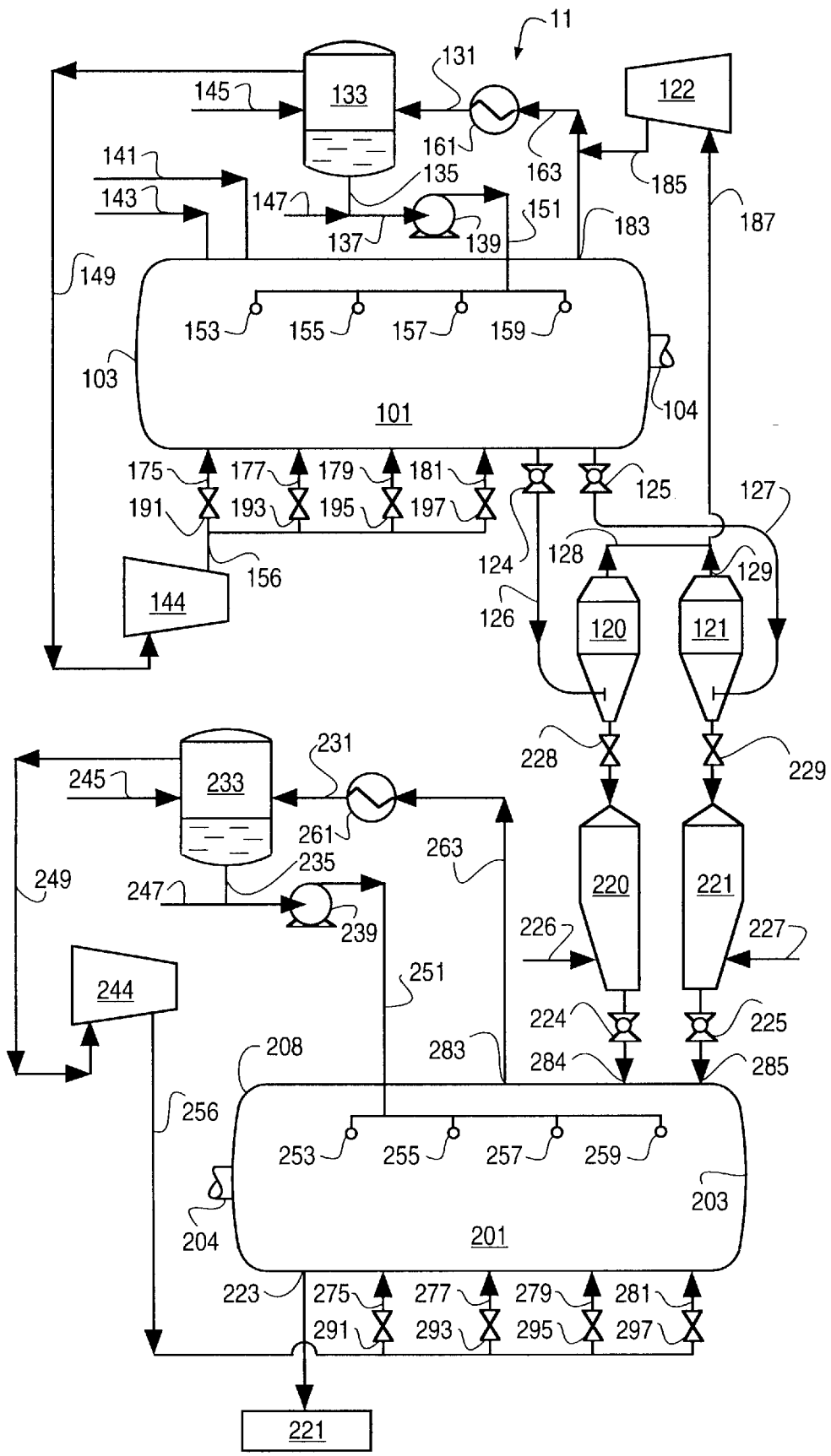

6,069,212

TRANSFER OF POLYMER PARTICLES BETWEEN VAPOR PHASE POLYMERIZATION REACTORS CONTAINING QUENCH-COOLED SUBFLUIDIZED PARTICULATE BEDS OF POLYMERIZED MONOMER

CROSS-REFERENCE TO RELATED APPLICATIONS

This application claims the benefit of U.S. Provisional Application No. 60/024,419, filed Aug. 20, 1996, which application is specifically incorporated herein, in its entirety, by reference.

TECHNICAL FIELD

The present invention relates to processes for continuous vapor phase polymerization of a polymerizable monomer or mixture thereof to produce normally solid polymer substances in two or more serially disposed vapor phase polymerization reactors, each containing a quench-cooled subfluidized particulate bed of polymerized monomer. More specifically, this invention is a method and apparatus for transfer of polymer particles between high pressure, reactive gas-filled, continuous, vapor-phase polymerization reactors while maintaining each at independently selected operating conditions.

Polymers formed from alkenes of 2 to 8 carbon atoms such as propylene or a mixture of propylene and other lower alkenes often have a tendency to agglomerate under operating conditions during polymerization. Such sticky polymers are difficult to transfer between reaction vessels in granular or particulate forms. Methods and apparatus according to this invention advantageously are useful for transfer of sticky polymer particles, particularly between subfluidized particulate beds of alpha-olefin polymers in high pressure, reactive gas-filled, continuous, vapor-phase polymerization reactors.

BACKGROUND OF THE INVENTION

Vapor-phase polymerization of a polymerizable monomer or mixture thereof to produce normally solid polymer substances using a quench-cooled, vapor-phase polymerization reactor containing a subfluidized particulate bed of polymerized monomer has been described in a number of patents including: U.S. Pat. No. 3,957,448 (Shepard et al.), U.S. Pat. No. 3,965,083 (Jezl et al.) and U.S. Pat. No. 3,971,768 (Peters et al.), the disclosures of which are specifically incorporated herein in their entirety by reference. These U.S. Patents, assigned to the assignee of the present invention, describe polymerization processes and apparatus in which polymer is formed from gaseous monomer in horizontal stirred-bed vessels.

In a single reactor, polymerization of monomer or mixture thereof from the vapor state is carried out by an essentially isobaric process typically using a high yield catalyst and cocatalyst. Typically, in operation of such processes and apparatus, particles of polymer are formed around solid catalyst particles.

The horizontally disposed reactor vessel has recycle propylene gas introduced into the bottom thereof together with hydrogen gas. Typically, quench liquid, such as liquid propylene, is injected into the reactor from the top of the reactor. The hydrogen is provided for molecular weight control.

Gases and vapors within the reactor vessel are free to circulate and mix together throughout the vapor space. For continuous production of some polymers, particularly copolymers, where it may be necessary to have different gas compositions at subsequent stages of polymerization, a series of two or more reactors is required.

Paddle wheels or other types of stirring vanes inside the vessel sweep through the bed of polymer particles and stir the contents of the vessel. The various types of stirring vanes including staggered paddles, inclined paddles, spiral vanes, or vanes provided with a scraper for scraping the internal wall of the reactor vessel.

Near one end (front end disposed opposite to a take-off end) of the horizontal vessel a catalyst system comprising a catalyst injected at least one point into the top of the vessel, and a cocatalyst plus modifier injected at a point adjacent the point of injection of the catalyst, is injected into the top of the vessel.

Solid particles of polymerized monomer are created in the vessel and are withdrawn from the take-off end thereof. Particles of polymerized monomer build up in the stirred reactor and traverse the length of the reactor essentially because of polymerization in the bed and not by the agitator. Advantageously, this condition is ensured by the design of the agitator such as to provide for agitation, but not for backward or forward movement of the particles. Since a stirred bed is not in a fluidized condition, back-mixing of the particles of polymerized monomer in the horizontally disposed reactor vessel is limited. In contrast, solid particles in a fluidized bed are very well mixed. Even at commercially useful ratios of length to diameter, horizontal stirred-bed reactor systems can readily achieve a degree of mixing of solids equivalent to two, three, or more theoretical back-mix reactors. Thus, horizontal stirred-bed reactor systems are particularly advantageous, as compared fluidized-bed reactors, for direct production of polymers in a particulate form.

It is desirable to create polymer particles as quickly as possible, and for this purpose a number of different high activity catalyst systems have been developed.

Use of solid, transition metal-based, olefin polymerization catalyst components is well known in the art including such solid components supported on a metal oxide, halide or other salt such as widely-described magnesium-containing, titanium halide-based catalyst components. Such catalyst components commonly are referred to as "supported."

As is well known in the art, particulate polymers and copolymers may be sticky, i.e., tend to agglomerate, due to their chemical or mechanical properties or pass through a sticky phase during the production cycle. Sticky polymers also are referred to as non-free flowing polymers because of their tendency to compact into aggregates of much large size than the original particles and not flow out of the relatively small openings in the bottom of product discharge tanks or purge bins. Polymers of this type show acceptable fluidity in a gas phase fluidized bed reactor, however, once motion ceases, the additional mechanical force provided by the fluidizing gas passing through the distributor plate is insufficient to break up the aggregates which form and the bed will not refluidize.

Sticky polymers also can be defined by their flow, called the Flow Factor, which references the flow of all materials to that of dry sand. On a scale of 1 to 10, the Flow Factor of dry sand is 10. The Flow Factor of free flowing polymers is about 4 to 10 while the Flow Factor of non-free flowing or sticky polymers is about 1 to 3.

Means for powder transfer between vertically disposed fluidized bed reactors is described with apparatus for gas phase polymerization of alpha-olefin in U.S. Pat. No. 4,703,094 and U.S. Pat. No. 4,902,483. The powder transfer means described includes three serially connected vessels (a discharge vessel, a decompression vessel and a compression vessel) and a pneumatic lifting system which uses reaction gas from the downstream reactor. The patents teach that times of contact of the powder with reaction gas from the downstream reactor in the compression vessel and the pneumatic lifting system must be very limited: less than or equal to 60 seconds in the compression stages, and less than or equal to 180 seconds in the pneumatic lifting stage. Because reaction gas from the downstream reactor is used in the compression vessel and the pneumatic conveyance of the powder, reaction gas from the downstream reactor is transferred into the upstream reactor with gas recycled from the decompression vessel into the upstream reactor.

Although polymers that are sticky can be produced in non-gas phase processes, there are certain difficulties associated with the production of such products in, for example, slurry or bulk monomer polymerization processes. In such processes, the diluent or solvent is present in the resins exiting the reaction system at a high concentration leading to severe resin purging problems particularly if the material in question is a low molecular weight resin or a very low crystallinity resin. Environmental considerations are such that the dissolved monomers and diluent must be removed from the polymer prior to its exposure to air. Safety also dictates the removal of residual hydrocarbons so that closed containers containing the polymers will not exceed safe volatiles levels in the gas head space over the resin. The safety and environmental concerns are accompanied by a definite economic factor in determining a preference for a quench-cooled, vapor-phase polymerization reactor containing a subfluidized particulate bed of polymerized monomer. The low number of moving parts and the relative lack of complexity in a basic subfluidized bed process enhances the operability of the process and typically results in lower costs of production. Low costs of production are due, in part, to low volumes of recycled process streams and a high unit throughput.

Horizontal stirred-bed reactor systems disclosed in Shepard et al., Jezl et al., Peters et al., and in U.S. Pat. No. 4,101,289 ('289), U.S. Pat. No. 4,129,701 ('701), U.S. Pat. No. 4,535,134 (de Lorenzo et al.), U.S. Pat. No. 4,627,735 (Rose et al.), U.S. Pat. No. 4,640,963 (Kreider et al.), U.S. Pat. No. 4,883,847 (Leung et al.), U.S. Pat. No. 4,921,919, (Lin et al.) and U.S. Pat. No. 5,504,166 (Buchelli et al.), the disclosures of which are specifically incorporated herein in their entirety by reference, largely or completely solve problems related to vapor phase, solution or slurry polymerization and reaps important economic benefits through savings in energy consumption, raw materials, and capital costs.

Although previously known vapor-phase polymerization systems are entirely satisfactory for manufacture of many commercial polymers, a need still exists for an improved method and/or apparatus for transfer of growing polymer particles between high pressure, reactive gas-filled, continuous, vapor-phase polymerization reactors while maintaining each at independently selected operating conditions. Desirably, the improved process produces fewer fine particles (fines) during transfer. Such fines tend to hang-up or become trapped in transfer equipment and can even plug lines and valves. More desirably, the improved transfer apparatus increases the range in physical properties of polymers which can be manufactured at high rates of production without interruptions in operation. Especially welcome are improved methods and/or apparatus which more closely achieve continuous steady-state conditions throughout the vapor-phase process and thereby produce polymer products having more uniform physical properties.

One problem with known polymerization processes and apparatus using a vapor-phase polymerization system having two or more serially disposed polymerization reactor vessels, is reliable and accurate methods for interreactor transfer and metering of polymer particles from upstream to downstream, high pressure, reactive gas-filled, continuous, vapor-phase polymerization reactors while maintaining each reactor at independently selected operating conditions.

SUMMARY OF THE INVENTION

One aspect of this invention is a process for continuous vapor phase polymerization of a polymerizable monomer or mixture thereof to produce normally solid polymer substances in two or more serially disposed vapor phase polymerization reactors, each containing a quench-cooled subfluidized particulate bed of polymerized monomer, the polymer particles being transferred between high pressure, reactive gas-filled, continuous, vapor-phase polymerization reactors while maintaining each reactor at independently selected operating conditions. The process includes the steps of:

(a) discharging a slug containing polymer particles and reactive gases from an upstream reactor, (b) collecting the polymer particles in a transfer chamber having side walls which are vertical and/or inclined toward a bottom discharge port at an angle of less than about 20° from vertical, while maintaining the pressure therein at least 5 psi (35 kPa) below the operating pressure of the upstream reactor, (c) repeating steps (a) and (b) to detach a suitable mass of polymer particles from the bed in the upstream reactor, (d) displacing a substantial portion of the reactive gases from the collected polymer particles and the transfer chamber with a purge gas having a composition which is compatible with the independently selected operating conditions in each reactor, and different from the composition of reactive gases in the upstream reactor, (e) pressurizing the transfer chamber gas pressure to at least 1 psi (7 kPa), preferably at least 2 psi (14 kPa), above the operating pressure of the downstream reactor to facilitate transfer of the polymer particles from the transfer chamber into the downstream reactor, and (f) dumping the polymer particles from the transfer chamber into the downstream reactor.

In another aspect the invention further includes recycling at least a portion of the reactive gases and purge gas in the transfer chamber to the upstream reactor through gas recycle means comprising a gas compressor which is isolated from each transfer chamber during steps (e) and (f).

DESCRIPTION OF THE DRAWING

FIG. 1 shows one embodiment of a vapor-phase polymerization system having two serially disposed polymerization reactors each containing a mechanically-stirred, subfluidized particulate polymer bed wherein at least a portion of the heat of polymerization is removed by evaporative cooling using a readily volatilizable quench liquid, with essentially total reactor off-gas recycle, and apparatus for isolated interreactor transfer of polymer particles from upstream to downstream, high pressure, reactive gas-filled, continuous, vapor-phase polymerization reactors while maintaining each at independently selected operating conditions useful in explaining the invention.

DESCRIPTION OF THE INVENTION

Transfer of polymer particles according to the invention is, advantageously, carried out using dual transfer chambers operated in alternating sequences. Duration of each sequence can be any suitable length of time depending upon particular monomers, conditions of operation, rate of polymerization, size of apparatus, etc. Cycle times for transferring polymer particles between continuous, vapor-phase polymerization reactors in accordance with this invention are, generally, in a range upward from about 1 minute to about 30 minutes, and longer for lower rates of polymerization. Preferred cycle times are in a range of from about 1 to about 10 minutes. More preferred cycle times are in a range of from about 2 to about 8 minutes. Most preferred cycle times are in a range of from about 3 to about 6 minutes.

Cycle time for steps which detach polymer particles from the bed in the upstream reactor is, generally, from about 5 percent to about 90 percent of the duration of each sequence. In preferred sequences, cycle times for detaching particles from the bed are in a range of from about 15 percent to about 75 percent of the duration of each sequence, more preferred detaching times are in a range of from about 25 percent to about 60 percent of the duration of each sequence.

Reactive gases include, typically, at least one member of the group consisting of ethylene (ethene), propylene (propene), a butene, and mixtures thereof. In a preferred aspect of the invention the reactive gases in the upstream reactor comprise at least two polymerizable monomers. Where more than one monomer is present in the upstream reactor, composition of the purge gas is, advantageously, substantially free of at least one of the monomers.

Processes for continuous polymerization according to the present invention are, generally, carried out using two serially disposed vapor phase polymerization reactors in which subfluidized particulate beds of polymerized monomer are contained in a cylindrical portion of each polymerization reactor with a horizontally disposed axis of rotation. These reactors have, typically, the same nominal dimensions, such as, length and diameter. The axis of rotation of the upstream reactor can, advantageously, be disposed at an elevation the same as or higher than the axis of rotation of the downstream reactor.

Processes according to the present invention are, advantageously, used for continuous polymerization of two monomers. Preferably, the polymerizable monomers are ethene and propene, more preferably, the composition of the gas phase in the upstream reactor is predominantly propene.

Many desired polymer products are produced from co-monomers ethene and propene by continuous polymerization according to the present invention. Difficulties inherent in transfer between reaction vessels of solid polymer substances in granular and particulate forms are, advantageously, mitigated where composition of the gas phase in the upstream reactor which is essentially free of ethene, and the purge gas is, also, essentially free of ethene.

Other desired polymer products are produced from co-monomers ethene and propene by continuous polymerization according to the present invention where composition of the gas phase in each of the polymerization reactors is predominantly propene, and ethene is, predominantly, polymerized in the upstream reactor.

The subfluidized particulate beds of polymerized monomer are mechanically stirred and have a free surface within each reactor. Transfer of polymer particles according to the invention is, advantageously, carried out discharging each slug of polymer particles and reactive gases from the upstream reactor through an outlet port located in the reactor wall at an elevation below the free surface of the subfluidized bed of polymerized monomer therein.

Polymer particles collected in the transfer chamber are, preferably, dumped from the transfer chamber into the downstream reactor through an inlet port located in the reactor wall at an elevation above the free surface of the subfluidized bed of polymerized monomer therein.

The subfluidized particulate beds of polymerized monomer are, typically, contained in a cylindrical portion of each horizontal reactor vessel. The axis of rotation of the upstream reactor may be disposed at an elevation higher than the axis of rotation of the downstream reactor.

Another aspect of the invention is a continuous vapor-phase polymerization of at least one alpha-olefin monomer in a reaction mixture comprising a first alpha-olefin monomer and, if copolymerization is occurring, a second alpha-olefin monomer, comprising: conducting the polymerization under polymerization conditions of temperature and pressure in the presence of hydrogen and a catalyst system comprising a solid catalyst comprising a first metal and a cocatalyst comprising a second metal, in at least one reactor. In each such reactor at least a portion of the heat of polymerization is removed by evaporative cooling of a volatilizable quench liquid comprising liquefied first monomer and, if copolymerization is occurring, liquefied second monomer. Each reactor is a substantially horizontal reactor of substantially circular cross-section containing a centrally-located drive shaft extending longitudinally through such reactor to which are attached a plurality of adjacently located paddles. Paddles cause essentially no forward or backward movement of the particulate polymer product contained in such reactor and extend transversely within and to a short distance from the internal surfaces of such reactor. The reactor system also includes; driving means in each such reactor for the drive shaft; one or more reactor off-gas outlets spaced along the topward part of each such reactor; a plurality of vapor recycle inlets spaced along the bottomward part of each such reactor for recycle of unreacted first monomer and, if copolymerization is occurring, unreacted second monomer; one or more catalyst and cocatalyst addition inlets spaced along each such reactor; a plurality of quench liquid inlets spaced along the topward part of each such reactor whereby quench liquid can be introduced into such reactor; and take-off means in each such reactor for the particulate polymer product at one or both ends of such reactor.

Suitable rates of quench liquid addition are, preferably, large enough to obtain the maximum cooling effect of the quench liquid, but low enough to keep the particulate bed of polymerized monomer dry. Generally, the quench liquid carries away 50 percent or more of the heat of polymerization.

Yet another aspect of the invention is apparatus for use in a vapor-phase polymerization system having two or more serially disposed polymerization reactors each containing a mechanically-stirred, subfluidized particulate polymer bed wherein at least a portion of the heat of polymerization is removed by evaporative cooling using a readily volatilizable quench liquid, inert to polymerizing monomers. More specifically, apparatus for isolated interreactor-transfer of polymer particles from upstream to downstream, high pressure, reactive gas-filled, continuous, vapor-phase polymerization reactors while maintaining each at independently selected operating conditions, comprising a means for sequential operation of (a) means for sequential discharge of one or more slugs containing polymer particles and reactive gases from the upstream reactor through an outlet port located in the reactor wall at an elevation below the free surface of the subfluidized bed of polymerized monomer therein, to detach a suitable mass of polymer particles from the bed in the upstream reactor, (b) means for separating discharged polymer particles from the reactive gases by means of a gas-solids settler, (c) means for sequential recycling reactive gases from the gas-solids settler to the upstream reactor by means of a gas compressor, (d) means for sequential collecting settled polymer particles in a transfer chamber having side walls which are vertical and/or inclined toward a bottom discharge port at an angle of less than about 20° from vertical, (e) means for sequential displacing and recycling at least a portion of the reactive gases from the settled polymer particles and the transfer chamber with a purge gas having a composition suitably different from the reactive gases in the upstream reactor, (f) means for sequential pressurizing the transfer chamber gas pressure to at least operating pressure of the downstream reactor to facilitate transfer of the polymer particles from the transfer chamber into the downstream reactor, and (g) means for sequential discharging the polymer particles from the transfer chamber into the downstream reactor through an inlet port located in the reactor wall at an elevation above the free surface of the subfluidized bed of polymerized monomer in the downstream reactor.

According to the invention there is provided a reactor system and process which can economically and efficiently convert a polymerizable monomer or a mixture thereof to polymer substances in a vapor phase, essentially isobaric polymerization process, which reactor is a subfluidized stirred-bed, quench-cooled, horizontal reactor with essentially total reactor off-gas recycle capable of multiple temperature operation. The apparatus is, generally, characterized by a stirred agitation of the quench-cooled polymer bed contained in therein by transversely oriented paddles connected to a longitudinally oriented drive shaft typically located centrally in the reactor and is, typically, further characterized by segmentation of the reactor into two or more polymerization sections capable of being individually controlled with respect to polymer production rates and polymerization temperature and, in one embodiment, partial pressures of the reactor gases as well.

The continuous, vapor-phase polymerization system described herein can be applied to the polymerization of polymerizable monomers which are polymerizable below the softening point of their polymer forms including ethylene, propylene, 4-methyl-pentene-1, butene-1, vinyl chloride, butadiene, and mixtures of such monomers. Particularly suitable are the polymerization of ethylene and propylene.

According to the invention, the continuous, vapor-phase polymerization system is characterized by having at least one horizontally disposed polymerization reactor section containing a mechanically-stirred subfluidized particulate polymer bed wherein at least a portion of the heat of polymerization is removed by evaporative cooling using a readily volatilizable quench liquid. Mechanical agitation of the polymer bed is, generally, by transversely oriented paddles connected to a longitudinally oriented drive shaft typically located centrally in the reactor. The reactor is segmented into two or more polymerization sections which, optionally, can be separated one from another by suitable barriers such as weirs.

The invention provides method and apparatus for transfer of polymer particles between high pressure, reactive gas-filled, continuous, vapor-phase polymerization reactors while maintaining each at independently selected operating conditions.

The method of the present invention is employed with at least one substantially horizontal reactor of substantially circular cross-section containing a centrally-located drive shaft extending longitudinally through each such reactor, to which are attached a plurality of adjacently located paddles, which paddles cause essentially no forward or backward movement of the particulate polymer product contained in such reactor and extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of the reactor; one or more catalyst and cocatalyst addition inlets spaced along each such reactor; a plurality of quench liquid inlets spaced along the topward part of each such reactor whereby quench liquid can be introduced into each such reactor; and take-off means in each such reactor for the particulate product at one or both ends, preferably at one end of such reactor.

The polymerization process using two aforesaid substantially horizontal reactors for manufacturing a homopolymer, for example, of propylene, random copolymer, for example, of propylene and ethylene, and/or an impact co-polymer, for example, of propylene and ethylene, is shown schematically in FIG. 1.

FIG. 1 shows one embodiment of a vapor-phase polymerization system of this invention using dual apparatus for isolated interreactor transfer of polymer particles from upstream to downstream, high pressure, reactive gas-filled, continuous, vapor-phase polymerization reactors. Two serially disposed polymerization reactors each containing a mechanically-stirred, subfluidized particulate polymer bed wherein at least a portion of the heat of polymerization is removed by evaporative cooling using a readily volatilizable quench liquid, with essentially total reactor off-gas recycle, and apparatus for isolated interreactor transfer of polymer particles from upstream to downstream, high pressure, reactive gas-filled, continuous, vapor-phase polymerization reactors while maintaining each at independently selected operating conditions, are, generally, indicated by the numeral 11.

In FIG. 1, upstream and downstream vessels, where polymerization occurs, are horizontal cylindrical reactors 101 and 201, respectively, that contain, for example, polypropylene powder. Reaction volume of each horizontal polymerization reactor operates as a series of several stirringly agitated sections to provide for the possibility of operating the different sections of the reactor at different temperatures and/or different polymer production rates. Polymerization takes place in all reaction sections to form a particulate polymer bed distributed throughout the reactors. Powder level in both reactor 101 and reactor 201 is, generally, maintained at approximately 40 to 80 percent of the total reactor volume.

Reactor 101 operates, typically, under an internal pressure of about 200 to about 400 psig (1400 to 2800 kPa) and at a temperatures in a range of about 50 to about 90° C. during production of polypropylene. Polymerization temperatures in each of the sections can be individually controlled by a combination of techniques including the stirring agitation, the controlled differential introduction of vapor recycle into each of the sections through inlets 175, 177, 179, and 181 spaced along the bottom of the reactor by means of valves 191, 193, 195, and 197, respectively, and the introduction into each of the sections of inert quench liquid at different rates through quench liquid inlets 153, 155, 157, and 159. Catalyst, cocatalyst and/or modifier systems are introduced into reactor 101, near front end 103 thereof, through inlet conduits 141 and 143 spaced along the top of the reactor.

Reactor off-gases are removed through outlet 183. Certain deleterious amounts of polymer fines are, typically produced in vapor-phase polymerization reactors. Advantageously, polymer fines are substantially removed prior to cooling of reactor off-gases in off-gas cooler/condenser 161, by using traps, filters, settlers, cyclones, or scrubbers or a combination thereof. Effluent from off-gas cooler/condenser 161 is transferred via conduit 131 into gas-liquid separator 133. Monomers are supplied from storage (not shown) via conduit 147 and combined with condensed liquid via conduit 135 from separator 133 to suction of pump 139 via conduit 137. Pump 139 delivers quench liquid to quench liquid inlets 153, 155, 157, and 159 via conduit 151.

Gases useful to control the polymerization process, e.g., limited amounts of hydrogen to obtain a desired molecular weight of polymer produced, may be introduced into separator 133 from storage (not shown) via conduit 145. Recycle gases from separator 133 flow to compressor 144 via conduit 149.

Polymer solid is produced in each of the stirringly agitated reaction sections. Due to continued production of such polymer, an amount of polymer product constantly passes to the take-off end disposed opposite the front end 103 of the reactor 101.

Dual trains of apparatus for isolated interreactor transfer of polymer particles from upstream to downstream, high pressure, reactive gas-filled, continuous, vapor-phase polymerization reactors are depicted in FIG. 1. Particulate polymerized monomer is transferred from reactor 101 and into reactor 201 during alternating cycles, typically on time control.

A cycle begins, for example, by brief openings of outlet valve 124 (or 125) to discharge one or more slugs containing polymer particles and reactive gases from the upstream reactor through an outlet port located in the reactor wall at an elevation below the free surface of the subfluidized bed of polymerized monomer therein, to detach a suitable mass of polymer particles from the bed in the upstream reactor. Such mass is, generally, at least twice the average rate of polymer production during the period of discharge.

Each slug is shot (transferred) through conduit 126 (or 127) into gas-solid separator (settler) 120 (or 121) which is maintained at a suitably lower pressure than reactor 101. Gas-solid separators 120 and 121 are, advantageously, disposed at elevation higher than the top of reactor 201 and directly above pressure transfer chambers 220 and 221 respectively. As discharged polymer particles are separated from reactive gases, the polymer particles fall through open valve 228 (or 229) and are collected in transfer chamber 220 (or 221). Side walls of the transfer chamber are vertical and/or inclined toward a bottom discharge port at an angle of less than about 20° from vertical.

Particularly where compositions of reactive gases in upstream reactor 101 and downstream reactor 201 are critically different, e.g., during production of high quality copolymers, the transfer cycle advantageously includes a period of purging. Purge gas is introduced to transfer chamber 220 (or 221) from storage (not shown) via conduit 226 (or 227) for sequential displacing and recycling at least a portion of the reactive gases from the settled polymer particles and the transfer chamber. Suitable purge gases have, generally, a composition different from the reactive gases in the upstream reactor and are compatible with the conditions in both the upstream reactor and the downstream reactor. Thus, purge gas is combined with reactive gases from the gas-solids settler and recycled to the upstream reactor via setter gas conduit 128 (or 129) and conduit 187 to suction of gas compressor 122. Effluent from gas compressor 122 flows via conduit 185 and conduit 163 into cooler/condenser 161.

After the period of purging, transfer chamber 220 (or 221) is isolated from gas-solid separator 120 (or 121) by closing valve 228 (or 229). Purge gas is used to pressurize the transfer chamber gas pressure to at least about 1psig (7 kPa) and, preferably about 5 psig (35 kPa) above, operating pressure of the downstream reactor to facilitate transfer of the polymer particles from the transfer chamber into the downstream reactor.

Finally, valve 224 (or 225) is opened, discharging (dumping) the polymer particles from the transfer chamber into the downstream reactor through an inlet port located in the reactor wall at an elevation above the free surface of the subfluidized bed of polymerized monomer in the downstream reactor.

Reactor 201 operates, typically, under an internal pressure of about 200 psig (1400 kPa) to about 400 psig (2800 kPa) and at a temperatures in a range of about 50 to about 90° C. during production of polypropylene. As in reactor 101, polymerization temperatures in each of the sections can be individually controlled by a combination of techniques including the stirring agitation, the controlled differential introduction of vapor recycle into each of the sections through inlets 275, 277, 279, and 281 spaced along the bottom of down stream reactor 201 by means of valves 291, 293, 295, and 297, respectively, and the introduction into each of the sections of inert quench liquid at different rates through quench liquid inlets 253, 255, 257, and 259. Because highly active catalyst, cocatalyst and/or modifier systems have been introduced into reactor 101 and at least a portion of which are transferred into reactor 201 with the polymer particles, introduction of additional catalyst is, generally, not required.

Off-gases are removed downstream reactor 201 through outlet 283. Polymer fines are, typically, substantially removed prior to cooling of reactor off-gases in off-gas cooler/condenser 261, by again using traps, filters, settlers, cyclones, or scrubbers or a combination thereof. Effluent from off-gas cooler/condenser 261 is transferred via conduit 231 into gas-liquid separator 233. Liquid monomers are supplied from storage (not shown) via conduit 247 and combined with condensed liquid via conduit 235 from separator 233 to suction of pump 239. Pump 239 delivers quench liquid to quench liquid inlets 253, 255, 257, and 259 via conduit 251.

Monomer and/or other gases, may be introduced into separator 233 from storage (not shown) via conduit 245. Recycle gases from separator 233 flow to compressor 244 via conduit 249.

Due to continued production of solid polymer, an amount of polymer product constantly passes to the take-off end disposed opposite the front end 203 of the reactor 201. Discharge apparatus 221 is connected to a discharge port 223 at the take-off end of reactor 201. Particulate polymerized monomer product is discharged from the reactor, typically on time control, to a gas expansion bag filter (not shown).

As employed herein, unless otherwise indicated, the term "polymerization" is intended to include both homopolymerization and copolymerization, and the term "polymer" is intended to include both homopolymer and copolymer.

The method of this invention is useful in the stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The method of this invention is particularly effective in the stereospecific polymerization of propylene or mixtures thereof with ethylene or a higher alpha-olefin. According to the invention, highly crystalline polyalpha-olefin homopolymers or copolymers are prepared by contacting at least one alpha-olefin with the catalyst described hereinbelow under polymerization conditions. Such conditions include polymerization temperature and time, pressure(s) of the monomer(s), avoidance of contamination of catalyst, the use of chain transfer agents to control polymer molecular weights, and other conditions well known to persons skilled in the art.

In the method of the present invention, polymerization should be carried out at temperatures sufficiently high to ensure reasonable polymerization rates and to avoid unduly long reactor residence times, but not so high as to result in the production of unreasonably high levels of stereo-random products due to excessively rapid polymerization rates. Generally, temperatures range from about 0° C. to about 120° C., with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization according to this invention is carried out at monomer pressures of about atmospheric or above. Monomer pressures should not be below the vapor pressure at the polymerization temperature of the alpha-olefin to be polymerized, and generally monomer pressures range from about 20 to about 600 psi.

The amount of the catalyst or catalyst component to be employed in the method of this invention varies depending on choice of reactor size, monomer to be polymerized, the specific catalyst used, and other factors known to persons of skill in the art. Typically, a catalyst or catalyst component is used in amounts ranging from about 0.2 to about 0.02 milligrams of catalyst to gram of polymer produced.

Use of solid, transition metal-based, high activity, olefin polymerization catalyst components is preferable in the reactor system described in this invention and is well known in the art including such solid components supported on a metal oxide, halide or other salt such as widely-described magnesium-containing, titanium halide-based catalyst components. Numerous supported, magnesium-containing, titanium-containing, electron donor containing olefin polymerization or copolymerization catalysts have been disclosed. For example, Arzoumanidis et al., U.S. Pat. No. 4,866,022, incorporated by reference herein, discloses a method for forming an advantageous alpha-olefin polymerization or copolymerization catalyst or catalyst component useful in this invention. In addition to the solid, magnesium containing, titanium containing catalyst component, the polymerization catalyst system used to produce propylene polymers uses an aluminum alkyl component, such as triethylaluminum, and typically an external modifier component such as a silane compound as described in U.S. Pat. No. 4,829,038, incorporated by reference herein.

In general, catalysts which are most useful are those which are very active and give a high yield based on catalyst. Included in this group are cocatalysts composed of organometallic compounds of Periodic Groups IA, IIA, and IIIA and catalysts which are based on transition metal compounds. Aluminum alkyl compound cocatalysts are especially preferred and can be a trialkylaluminum or an alkyl aluminum halide such as a dialkylaluminum chloride. Transition metal catalyst can be a metal compound of Group IV or Group V such as a titanium or vanadium compound, a compound of Group VI such as chromium or molybdenum oxide, or can be one of the above catalysts supported on a magnesium-based support or a support such as alumina, silica, or silica-alumina.

Preferred catalysts and cocatalysts are high yield catalysts. "High yield" means that the residues of catalysts and cocatalysts do not have to be removed from the polymer products in a separate "deashing" process. Yields of such catalyst typically exceed 5000 grams of polymer per gram of catalyst and preferably exceed 15,000 grams of polymer per gram of catalyst.

While a wide variety of organometallic systems or solid catalysts can be employed for the polymerization of olefins, particularly propylene, to solid polymers, it is often preferred to use a catalyst which includes a combination of an aluminum alkyl and a titanium halide, preferably a trialkyl aluminum such as triethylaluminum in which the alkyl groups have from 1 to 12 carbon atoms each and a titanium chloride. The catalyst system most preferred is a mixture of trialkyl aluminum and a titanium chloride complex.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Typically, the silane employed as an external modifier in the method of this invention is diisopropyldimethoxysilane, diisobutydimethoxysilane, di-t-butyl-dimethoxysilane, t-butyltrimethoxysilane, diisopentyldimethoxysilane, di-t-pentyldimethoxysilane, dineopentyldimethoxysilane, neopentyltrimethoxysilane, isobutylisopropyl-dimethoxysilane, isobutyl-t-butyidimethoxysilane, and iso-propyl-t-butyidimethoxysilane and di-p-tolyldimethoxysilane. Preferably, the silane employed as an external modifier is diisopropyldimethoxysilane or diisobutyldimethoxysilane.

The aforesaid silane is present in the catalyst system employed in the method of this invention at a molar ratio of the metal in the cocatalyst to silane in the range of from about 1, preferably from about 3, to about 50, preferably to about 30.

Thus, a typical catalyst system for the polymerization or copolymerization of alpha-olefins by the method of this invention is formed by combining the supported titanium-containing catalyst or catalyst component described hereinbelow and an aforesaid alkyl aluminum compound as catalysts, together with the aforesaid silane. Typically, useful aluminum-to-titanium atomic ratios in such catalyst systems are about 10 to about 500 and preferably about 30 to about 400. Typical aluminum-to-silane compound molar ratios in such catalyst systems are about 3 to about 30.

Titanium-containing catalyst components that are especially useful in this invention are supported on hydrocarbon-insoluble, magnesium-containing compounds which are optionally in combination with an electron donor compound as an internal modifier. Such supported titanium-containing olefin polymerization catalyst component typically is formed by reacting a titanium (IV) halide, a magnesium-containing compound, and optionally an organic electron donor compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

The possible solid catalyst components listed above are only illustrative of many possible solid, magnesium-containing, titanium halide-based, hydrocarbon-insoluble catalyst components useful in this invention and known to the art. This invention is not limited to a specific supported catalyst or catalyst component.

Titanium (IV) compounds useful in preparing the solid titanium-containing catalyst component of invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OCH_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful as internal modifiers in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and the like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds as internal modifiers include esters of aromatic acids. Preferred organic electron donors are $C_1-C_6$ alkyl esters of aromatic mono- and dicarboxylic acids and halogen-, hydroxyl-, oxo-, alkyl-, alkoxy-, aryl-, and aryloxy-substituted aromatic mono-and dicarboxylic acids. Among these, the alkyl esters of benzoic and halobenzoic acids wherein the alkyl group contains 1 to 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-n-butylphthalate.

The electron donor component that may be used as internal modifiers in preparation of the solid catalyst component is used in an amount ranging from about 0.001 to about 1.0 mole per gram atom of titanium, and preferably from about 0.005 to about 0.9 mole per gram atom. Best results are achieved when this ratio ranges from about 0.01 to about 0.8 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

The catalyst or catalyst component of this invention is useful in the stereospecific polymerization or copolymerization of alpha-olefins containing 3 or more carbon atoms such as propylene, butene-1, pentene-1, 4-methylpentene -1, and hexene-1, as well as mixtures thereof and mixtures thereof with ethylene. The catalyst or catalyst component of this invention is particularly effective in the stereospecific polymerization or copolymerization of propylene or mixtures thereof with up to about 30 mole percent ethylene or a higher alpha-olefin. According to the invention, highly crystalline polyalpha-olefin homopolymers or copolymers are prepared by contacting at least one alpha-olefin with the above-described catalyst or catalyst component of this invention Under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 psi to about 600 psi (140 kPa to 4100 kPa), although in vapor phase polymerizations or copolymerizations, monomer pressures should not be below the vapor pressure at the polymerization or copolymerization temperature of the alpha-olefin olefin to be polymerized or copolymerized.

The polymerization or copolymerization time will generally range from about 1/2 to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about 1/2 to several hours are generally sufficient in continuous slurry processes.

Examples of gas-phase polymerization or copolymerization processes in which such catalyst or catalyst component is useful are described in U.S. Pat. Nos. 3,957,448; 3,965,083; 3,971,786; 3,970,61 1; 4,129,701; 4,101,289; 3,652,527; 4,003,712; 4,326,048; 4,337,069; 4,535,134; 4,569,809, 4,610,574; 4,640,963; 4,708,787; 5,209,607; and 5,504,166, all incorporated by reference here-in. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogenweights. Hydrogen is typically employed for this purpose in a manner known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymer or copolymer products produced in the presence of the invented catalyst can be fabricated into useful articles by extrusion, injection molding, and other common techniques.

In view of the features and advantages of the method and apparatus for transfer of polymer particles between high pressure, reactive gas-filled, continuous, vapor-phase polymerization reactors while maintaining each at independently selected operating conditions in accordance with this invention as compared to the known transfer system previously used, the following examples are given.

EXAMPLES

Continuous vapor phase polymerization of a polymerizable monomer, or a mixture of two monomers, was performed to produce normally solid polymer substances in two serially disposed vapor phase polymerization reactors, each containing a quench-cooled subfluidized particulate bed of polymerized monomer as described herein. The two cylindrical reactors have the same nominal dimensions of length and diameter in a ratio of length to diameter of 5 which were placed side by side with horizontal axis of rotation at the same elevation.

Polymer particles were transferred between these high pressure, reactive gas-filled, continuous, vapor-phase polymerization reactors while maintaining each reactor at independently selected operating conditions. One half of the cycle time for each train of the dual apparatus for isolated inter-reactor transfer of polymer particles from upstream to downstream reactor was used to detach a suitable mass of polymer particles from the bed in the upstream reactor repeating steps of (a) discharging a slug containing polymer particles and reactive gases from an upstream reactor, and (b) collecting the polymer particles in a transfer chamber having side walls which are vertical and/or inclined toward a bottom discharge port at an angle of less than about 20° from vertical, while maintaining the pressure therein at least 5 psi (35 kPa) below the operating pressure of the upstream reactor. Operating cycles of the two trains were staggered so that slugs are being discharged from the upstream reactor without substantial interruption. During the other half of the cycle time the steps of (d) displacing a substantial portion of the reactive gases from the collected polymer particles and the transfer chamber with a purge gas having a composition which is compatible with the independently selected operating conditions in each reactor, and different from the composition of reactive gases in the upstream reactor, (e) pressurizing the transfer chamber gas pressure to at least about 1 psi above the operating pressure of the downstream reactor to facilitate transfer of the polymer particles from the transfer chamber into the downstream reactor, and (f) dumping the polymer particles from the transfer chamber into the downstream reactor were carried out as described herein.

EXAMPLE 1

In this example, continuous vapor phase polymerization of propylene monomer (99.5 weight percent) was performed to produce normally solid homopolymer in two serially disposed vapor phase polymerization reactors, each containing a quench-cooled subfluidized particulate bed of polymerized monomer as described herein. Catalyst components and propylene monomer were fed into the upstream reactor where at least about 70 percent of the total homopolymer was produced. Additional propylene monomer was fed into the downstream reactor where up to about 30 percent of the total homopolymer was produced. Low levels of molecular hydrogen were present in both the downstream and the upstream reactor to control product properties. Transfer of sticky particles of polymerized propylene was carried out in accordance with this invention using total cycle times of about 4 minutes for each of the dual trains in staggered operation. Propylene monomer was used as purge gas.

EXAMPLE 2

In this example, continuous vapor phase polymerization of propylene monomer (99.5 weight percent) and ethylene monomer (99.9 weight percent) was performed to produce normally solid random co-polymer in two serially disposed vapor phase polymerization reactors, each containing a quench-cooled subfluidized particulate bed of polymerized monomer as described herein. Catalyst components, propylene monomer and ethylene monomer were fed into the upstream reactor where at least about 60 percent of the total random co-polymer was produced. Additional propylene monomer and ethylene monomer were fed into the downstream reactor where up to about 40 percent of the total random co-polymer was produced. Low levels of molecular hydrogen were present in both upstream and downstream reactors to control product properties. Transfer of sticky particles of polymerized propylene was carried out in accordance with this invention using total cycle times of about 4 minutes for each of the dual trains in staggered operation. Propylene monomer was used as purge gas.

EXAMPLE 3

In this example, continuous vapor phase polymerization of propylene monomer (99.5 weight percent) and ethylene monomer (99.9 weight percent) was performed to produce normally solid impact co-polymer in two serially disposed vapor phase polymerization reactors, each containing a quench-cooled subfluidized particulate bed of polymerized monomer as described herein. Catalyst components and propylene monomer were fed into the upstream reactor where at least about 75 percent, preferably at least about 85 percent, of the total impact co-polymer was produced. Additional propylene monomer and ethylene monomer were fed into the downstream reactor where up to about 30 percent of the total impact co-polymer was formed. Low levels of molecular hydrogen were present in both upstream and downstream reactors to control product quality. It was, however, critical that levels of molecular hydrogen in reactive gases of the downstream reactor were maintained at less than about 50 percent of levels of molecular hydrogen in reactive gases of the upstream reactor. Low levels of molecular oxygen were present in the downstream reactor to control product quality. It was critical that reactive gases in the upstream reactor are, essentially, free of molecular oxygen. Transfer of sticky particles of polymerized propylene was carried out in accordance with this invention using total cycle times of about 4 minutes for each of the dual trains in staggered operation. Propylene monomer was used as purge gas in transfer of particles of solid polymerized monomer from the upstream reactor into the downstream reactor while maintaining each at independently selected operating conditions.

EXAMPLE 4

In this example flow properties of two different polypropylene powders were tested. Samples were identified as Homopolymer I and Homopolymer II. Sieve analysis of the samples are reported in Table I and Table II below. Because Homopolymer I had more fine particles and less coarse particles than Homopolymer II it is believed to better represent particles forming under operating conditions and during transfer. Testing determined maximum wall angles from vertical required for continuous flow on steels with different surface finishes. In tests on steel with 2B finish Homopolymer II required wall angles 25° or less, but the finer Homopolymer I required wall angles of only 23° or less. Unexpectedly, flow of Homopolymer I using an electropolished surface required wall angles of 20° or less and #1 finish required even lower wall angles of 14° or less.

TABLE I

SIEVE ANALYSIS OF HOMOPOLYMER I

| U.S. SIEVE NUMBER | OPENING SIZE (inches) | (mm) | PERCENT RETAINED |
|---|---|---|---|
| #40 | 0.0165 | 0.419 | 55.60 |
| #60 | 0.0098 | 0.249 | 26.99 |
| #100 | 0.0059 | 0.150 | 3.92 |
| #120 | 0.0049 | 0.124 | 1.12 |
| #200 | 0.0029 | 0.074 | 2.29 |
| #325 | 0.0017 | 0.043 | 5.83 |
| PAN | | | 4.25 |

TABLE II

SIEVE ANALYSIS OF HOMOPOLYMER II

| U.S. SIEVE NUMBER | OPENING SIZE (inches) | (mm) | PERCENT RETAINED |
|---|---|---|---|
| #12 | 0.0661 | 1.679 | 0.00 |
| #20 | 0.9334 | 0.848 | 9.99 |
| #40 | 0.0165 | 0.419 | 58.95 |
| #100 | 0.0059 | 0.150 | 10.62 |
| PAN | | | 20.43 |

For the purposes of the present invention, "predominantly" is defined as more than about fifty percent. "Substantially" is defined as occurring with sufficient frequency or being present in such proportions as to measurably affect macroscopic properties of an associated compound or system. Where the frequency or proportions for such impact is not clear, substantially is to be regarded as about ten percent or more. "Essentially" is defined as absolutely except that small variations which have no more than a negligible effect on macroscopic propertied and final outcome are permitted, typically up to about one percent.

That which is claimed is:

1. A process for continuous vapor phase polymerization of a polymerizable monomer or mixture thereof to produce normally solid polymer in two or more serially disposed vapor phase polymerization reactors, each containing a quench-cooled subfluidized particulate bed of polymerized monomer, whereby particles are transferred between high pressure, reactive gas-filled, continuous, vapor-phase polymerization reactors while maintaining each reactor at independently selected operating conditions, which process comprises:

(a) discharging a slug containing particles of forming polymer and reactive gases from an upstream reactor, (b) collecting the particles in a transfer chamber having side walls which are vertical and/or inclined toward a bottom discharge port at an angle of less than about 20° from vertical, while maintaining the pressure therein at least 5 psi below the operating pressure of the upstream reactor, (c) repeating steps (a) and (b) to detach a suitable mass of particles from the bed in the upstream reactor, (d) displacing a substantial portion of the reactive gases from the collected particles and the transfer chamber with a purge gas having a composition which is compatible with the independently selected operating conditions in each reactor, and different from the composition of reactive gases in the upstream reactor, (e) pressurizing the transfer chamber gas pressure to at least about 1 psi above the operating pressure of the downstream reactor to facilitate transfer of the particles from the transfer chamber into the downstream reactor, and (f) discharging the particles from the transfer chamber into the downstream reactor;

wherein the transfer of polymer particles is carried out using dual transfer chambers operated in alternating sequences.

2. The process for continuous polymerization according to claim 1 wherein the operating pressure of each upstream reactor is at least 5 psi below the operating pressure of the following reactor.

3. The process for continuous polymerization according to claim 1 wherein the reactive gases comprise at least one member of the group consisting of ethene, propene, and a butene.

4. The process for continuous polymerization according to claim 1 wherein the process is carried out using two serially disposed vapor phase polymerization reactors.

5. The process for continuous polymerization according to claim 4 wherein the polymerizable monomers are ethene and propene.

6. The process for continuous polymerization according to claim 5 wherein composition of the gas phase in the upstream reactor is predominantly propene.

7. The process for continuous polymerization according to claim 6 wherein composition of the gas phase in the upstream reactor is essentially free of ethene.

8. The process for continuous polymerization according to claim 6 wherein composition of the gas phase in the downstream reactor is substantially ethene, and wherein the purge gas is essentially free of ethene.

9. The process for continuous polymerization according to claim 6 wherein composition of the gas phase in each of the polymerization reactors is predominantly propene, and wherein the ethene is, predominantly, polymerized in the downstream reactor.

10. The process for continuous polymerization according to claim 1 further comprises recycling at least a portion of the reactive gases and purge gas to the upstream reactor through gas recycle means comprising a gas compressor which is isolated from each transfer chamber during steps (e) and (f).

11. The process for continuous polymerization according to claim 1 wherein the quench liquid is at least one member selected from the group consisting of ethene, propene and butene.

12. The process for continuous polymerization according to claim 1 wherein the subfluidized particulate beds of polymerized monomer are mechanically stirred and have a free surface within each reactor.

13. The process for continuous polymerization according to claim 12 wherein each slug of particles and reactive gases is discharged from the upstream reactor through an outlet port located in the reactor wall at an elevation below the free surface of the subfluidized bed of polymerized monomer therein.

14. The process for continuous polymerization according to claim 12 wherein the polymer particles collected in the transfer chamber are dumped from the transfer chamber into the downstream reactor through an inlet port located in the reactor wall at an elevation above the free surface of the subfluidized bed of polymerized monomer therein.

15. The process for continuous polymerization according to claim 1 wherein the reactive gases comprise at least one member of the group consisting of ethene, propene, and a butene, and wherein the quench liquid comprises propane, a butane, a pentane, a hexane or a closely boiling mixture thereof.

16. The process for continuous polymerization according to claim 1 wherein the subfluidized particulate beds of polymerized monomer are contained in a cylindrical portion of each polymerization reactor having a horizontally disposed axis of rotation.

17. The process for continuous polymerization according to claim 16 further comprises recycling at least a portion of the reactive gases and purge gas to the upstream reactor through gas recycle means comprising a gas compressor which is isolated from each transfer chamber during steps (e) and (f).

18. The process for continuous polymerization according to claim 16 wherein axis of rotation of the upstream reactor is disposed at an elevation essentially the same as or higher than the axis of rotation of the downstream reactor.

19. A process for continuous vapor phase polymerization of a polymerizable monomer or mixture thereof to produce normally solid polymer in two or more serially disposed vapor phase polymerization reactors, each containing a quench-cooled subfluidized particulate bed of polymerized monomer, whereby particles are transferred between high pressure, reactive gas-filled, continuous, vapor-phase polymerization reactors while maintaining each reactor at independently selected operating conditions, which process comprises:

(a) discharging a slug containing particles of forming polymer and reactive gases from an upstream reactor, (b) collecting the particles in a transfer chamber having side walls which are vertical and/or inclined toward a bottom discharge port at an angle of less than about 20° from vertical, while maintaining the pressure therein at least 5 psi below the operating pressure of the upstream reactor, (c) repeating steps (a) and (b) to detach a suitable mass of particles from the bed in the upstream reactor, (d) displacing a substantial portion of the reactive gases from the collected particles and the transfer chamber with a purge gas having a composition which is compatible with the independently selected operating conditions in each reactor, and different from the composition of reactive gases in the upstream reactor, (e) pressurizing the transfer chamber gas pressure to at least about 1 psi above the operating pressure of the downstream reactor to facilitate transfer of the particles from the transfer chamber into the downstream reactor, and (f) discharging the particles from the transfer chamber into the downstream reactor through an inlet port located in the reactor wall at an elevation above the free surface of the subfluidized bed of polymerized monomer therein;

wherein the subfluidized particulate beds of polymerized monomer are contained in a cylindrical portion of each polymerization reactor having a horizontally disposed axis of rotation.

* * * * *

UNITED STATES PATENT AND TRADEMARK OFFICE
CERTIFICATE OF CORRECTION

PATENT NO.: 6,069,212

DATED: May 30, 2000

INVENTOR(S): Scott Ching-Sheng Hung, Kwok-Fu Lee, Joseph Michael Aubuchon, Daryl Henry Webster, James Hanawalt Lee It is certified that error appears in the above-identified patent and that said Letters Patent is hereby corrected as shown below:

Patent reads:

| Col. | Line | | |
|------|------|---|---|
| 12 | 50 | "diisobutydimethoxysilane" should read: "diisobutyldimethoxysilane" | |
| 12 | 55 | "butyidimethoxysilane," should read: "butyldimethoxysilane," | |
| 12 | 56 | "butyidimethoxysilane," should read: "butyldimethoxysilane," | |
| 15 | 47 | "molecular weights. Hydrogenweights. Hydrogen" should read: "molecular weights. Hydrogen" | |

UNITED STATES PATENT AND TRADEMARK OFFICE
CERTIFICATE OF CORRECTION

PATENT NO.: 6,069,212

DATED: May 30, 2000

INVENTOR(S): Scott Ching-Sheng Hung, Kwok-Fu Lee, Joseph Michael Aubuchon, Daryl Henry Webster, James Hanawalt Lee It is certified that error appears in the above-identified patent and that said Letters Patent is hereby corrected as shown below:

Patent reads:

| Col. | Line | | |
|------|------|---|---|
| 18   | 30   | "#20 | 0.9334" | should read:
"#20      0.0334"

Signed and Sealed this

Tenth Day of April, 2001

Attest:

NICHOLAS P. GODICI

*Attesting Officer*   *Acting Director of the United States Patent and Trademark Office*